E. BARTHOLOMAY & G. A. LOEB, Jr.
HEADER FOR GAS METERS.
APPLICATION FILED OCT. 18, 1915.

1,191,270.

Patented July 18, 1916.

Inventors:
Edward Bartholomay
George A. Loeb, Jr.
by their attorneys
Davis & Dorsey

UNITED STATES PATENT OFFICE.

EDWARD BARTHOLOMAY AND GEORGE A. LOEB, JR., OF ROCHESTER, NEW YORK.

HEADER FOR GAS-METERS.

1,191,270.      Specification of Letters Patent.      Patented July 18, 1916.

Application filed October 18, 1915. Serial No. 56,577.

*To all whom it may concern:*

Be it known that we, EDWARD BARTHOLOMAY and GEORGE A. LOEB, Jr., citizens of the United States, and residents of Rochester, in the county of Monroe and State of New York, have invented certain new and useful Improvements in Headers for Gas-Meters, of which the following is a specification.

This invention relates to headers or devices for attaching gas-meters to the gas-pipes with which they are connected, and for supporting the meters from such pipes.

It has previously been proposed to attach a gas-meter to gas-pipes by means adapted to support the meter from the pipes, so as to dispense with the necessity of providing a shelf or other special support for the meter. In such previous devices, however, the meter has been supported upon a narrow shelf or cross-bar, sustained at each end by a single rod connecting it with one of the fittings by which the meter is connected with the gas-pipes. It has been found that in such constructions there is danger of injury to the meter, owing to the fact that there is no adequate provision for protecting it against any accidental force tending to swing it forwardly or rearwardly.

The object of the present invention is to produce a header, of the type in question, in which the meter is effectively supported against forward and rearward strains, as well as against the vertical strain of its weight, so that the posts of the meter are relieved from all severe strains, and particularly against strains tending to bend them.

To the foregoing end the present invention resides in an arrangement in which, in place of a single supporting bearing or shelf at the middle of the meter, supporting-rods or members are employed which extend at opposite inclinations to the lower corners or angles of the meter, at the front and the rear, thus bracing the meter against horizontal as well as vertical strains.

Other objects of the invention, and the features of construction by which they are attained, will be set forth hereinafter, in connection with the following description of the illustrated embodiment of the invention.

Figure 1:
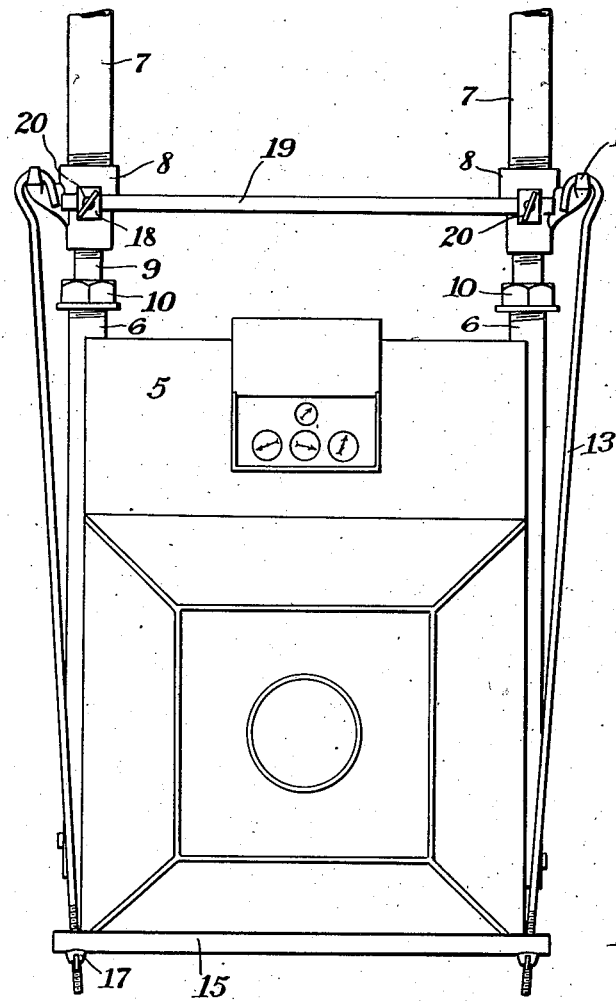
Figure 2:
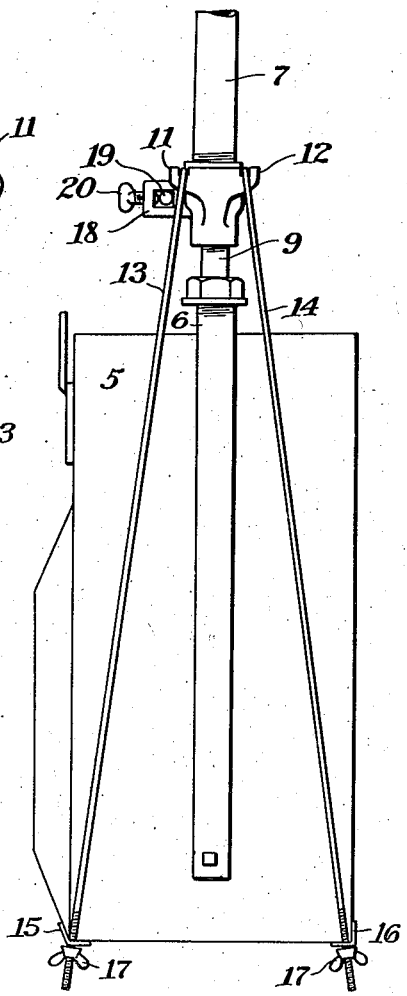

In the accompanying drawings: Figure 1 is a front-elevation of a header for gas-meters embodying the present invention, together with a meter supported and connected thereby; and Fig. 2 is a side-elevation of the same parts, seen from right to left in Fig. 1.

The invention is illustrated as embodied in a header adapted for supporting a gas-meter 5 of conventional form, this meter having the usual posts 6 through which gas is introduced to and discharged from the meter. The gas-pipes 7 are connected with the posts 6 by means comprising hollow fittings 8, which are screwed upon the pipes in the usual manner. Screwed into the bottom of each fitting 8 is a nipple 9, which is attached to the corresponding post 6 by means of a union 10. Each fitting 8 is provided with a lateral projection, comprising lugs 11 and 12 which extend, respectively, forwardly and rearwardly from the fitting. These lugs are notched to receive the hooked upper ends of rods 13 and 14, which extend to the forward and rear lower corners of the meter. The rods pass through openings at the ends of the angle-bars 15 and 16 in which the lower angles of the meter are seated, and, by means of nuts 17 on the rods, the angle-bars are drawn upwardly so as to adjust them to the height of the meter and subject the rods 13 and 14 to tension. To fix the fittings 8 at a suitable distance apart, and thus prevent any accidental strain upon the meter due to movement of the gas-pipes 7, each fitting 8 is provided with a lug 18, perforated to receive a cross-bar 19, and the bar is fixed adjustably, at its ends, in the lugs 18 by means of set-screws 20.

The above described arrangement is such that if pressure is applied to the front of the meter, tending to swing it rearwardly, the tension of the forward rods 13 is increased, and these rods resist rearward movement of the meter, the tensile force of the rods being resisted by a direct upward thrust or compression on the meter-posts, in place of the bending-strain to which they would otherwise be subjected. The rear rods 14 perform a similar function when the meter is subjected to any strain tending to swing it forward.

We claim:—

1. A header for a gas-meter having, in combination, fittings for connecting the meter with gas-pipes; angle-bars seated against the forward and rear lower angles of the meter-casing and extending to the sides of the casing; and rods connecting the ends of the angle-bars with the fittings.

2. A header for a gas-meter having, in combination, a pair of hollow fittings adapted to connect the inlet and outlet posts of the meter with the gas-main, a pair of supports extending divergingly downward from each fitting, and seats for the lower front and rear edges of a meter, each seat adapted to receive the lower ends of one pair of said rods.

3. A header for a gas-meter having, in combination, a pair of hollow fittings adapted to connect the inlet and outlet posts of the meter with the gas main, seats for the lower front and rear edges of a meter, and a pair of supports removably attached to each fitting and extending divergingly downward for attachment to the ends of one of said seats.

EDWARD BARTHOLOMAY.
GEORGE A. LOEB, Jr.